US012707538B2

(12) United States Patent
Miyaguchi

(10) Patent No.: US 12,707,538 B2
(45) Date of Patent: Aug. 11, 2026

(54) HEATER

(71) Applicant: KYOCERA Corporation, Kyoto (JP)

(72) Inventor: Takashi Miyaguchi, Kirishima (JP)

(73) Assignee: Kyocera Corporation, Kyoto (JP)

( * ) Notice: Subject to any disclaimer, the term of this patent is extended or adjusted under 35 U.S.C. 154(b) by 556 days.

(21) Appl. No.: 18/276,270

(22) PCT Filed: Mar. 3, 2022

(86) PCT No.: PCT/JP2022/009188
§ 371 (c)(1),
(2) Date: Aug. 8, 2023

(87) PCT Pub. No.: WO2022/186344
PCT Pub. Date: Sep. 9, 2022

(65) Prior Publication Data

US 2024/0114596 A1 Apr. 4, 2024

(30) Foreign Application Priority Data

Mar. 4, 2021 (JP) ................................. 2021-034408

(51) Int. Cl.
*H05B 3/14* (2006.01)

(52) U.S. Cl.
CPC ....... *H05B 3/141* (2013.01); *H05B 2203/027* (2013.01)

(58) Field of Classification Search
CPC .... H05B 3/141; H05B 2203/027; H05B 3/06; H05B 3/48
See application file for complete search history.

(56) References Cited

FOREIGN PATENT DOCUMENTS

JP 2019-021501 A 2/2019

*Primary Examiner* — Robert G Bachner
(74) *Attorney, Agent, or Firm* — Volpe Koenig

(57) ABSTRACT

A heater includes a ceramic base and a heat generating resistor. The ceramic base includes a plurality of crystal particles made of silicon nitride and a first grain boundary phase located between the plurality of crystal particles and containing oxides of a rare earth element and silicon. The heat generating resistor is located inside the ceramic base. The ceramic base includes a first region including an interface with the heat generating resistor and a second region farther away from the heat generating resistor than the first region. The distribution amount of the first grain boundary phase is greater in the first region than in the second region.

7 Claims, 1 Drawing Sheet

HEATER

CROSS-REFERENCE TO RELATED APPLICATIONS

This application is National Stage Application of International Application No. PCT/JP2022/009188, filed on Mar. 3, 2022, which designates the United States, incorporated herein by reference, and which claims the benefit of priority from Japanese Patent Application No. 2021-034408, filed on Mar. 4, 2021, the entire contents of which are incorporated herein by reference.

TECHNICAL FIELD

An embodiment of the disclosure relates to a heater.

BACKGROUND OF INVENTION

Conventionally, a heater including a ceramic base made of insulating ceramics and a heat generating resistor made of conductive ceramics embedded in the ceramic base has been known.

CITATION LIST

Patent Literature

Patent Document 1: JP 2019-021501 A

SUMMARY

A heater according to an aspect of an embodiment includes a ceramic base and a heat generating resistor. The ceramic base includes a plurality of crystal particles made of silicon nitride and a first grain boundary phase located between the plurality of crystal particles and containing oxides of a rare earth element and silicon. The heat generating resistor is located inside the ceramic base. The ceramic base includes a first region including an interface with the heat generating resistor and a second region farther away from the heat generating resistor than the first region. A distribution amount of the first grain boundary phase is greater in the first region than in the second region.

DESCRIPTION OF EMBODIMENTS

Hereinafter, an embodiment of a heater disclosed in the present disclosure will be described with reference to the accompanying drawings. The present disclosure is not limited by the following embodiment. Note that the drawings are schematic and that the dimensional relationships between elements, the proportions thereof, and the like may differ from the actual ones.

Figure 1:
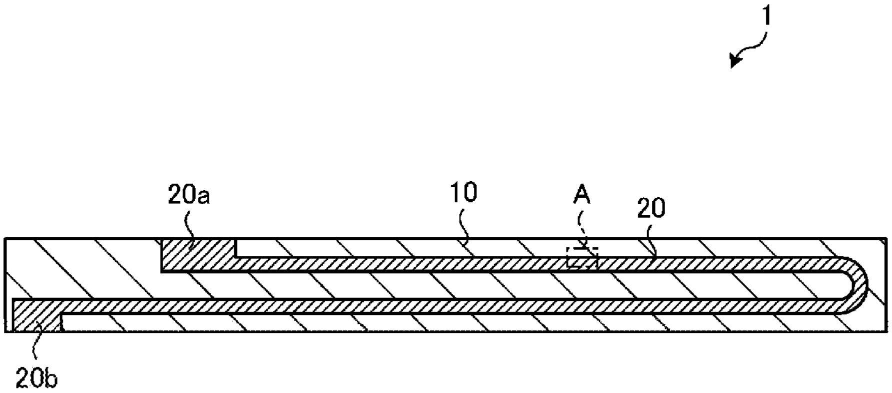
FIG. 1 is a cross-sectional view illustrating an example of a heater according to an embodiment.

FIG. 1 is a cross-sectional view illustrating an example of a heater according to an embodiment. As illustrated in FIG. 1, a heater 1 according to the embodiment includes a ceramic base 10 and a heat generating resistor 20.

The heater 1 has a cylindrical pillar shape, for example. The length of the heater 1 may be about 1 mm to 200 mm, particularly about 20 mm to 60 mm, for example. The outer dimension of the heater 1 may be about 0.5 mm to 100 mm, particularly about 2.5 mm to 5.5 mm, for example. The heater 1 is used as a heat source for a glow plug, an in-vehicle heater, an automatic soldering apparatus, or the like, for example.

The shape of the heater 1 is not limited to a cylindrical pillar shape, and may be an elliptical pillar shape or a prismatic pillar shape, for example. In addition, the shape of the heater 1 is not limited to the pillar shape, and may have a desired shape according to the application such as a rod shape or a plate-like shape, for example.

The ceramic base 10 is an insulator. The heat generating resistor 20 is a conductor, and is located inside the ceramic base 10. The heat generating resistor 20 has terminals 20*a* and 20*b* at both ends. The heat generating resistor 20 generates heat by energization through the terminals 20*a* and 20*b* from lead wires (not illustrated).

Figure 2:
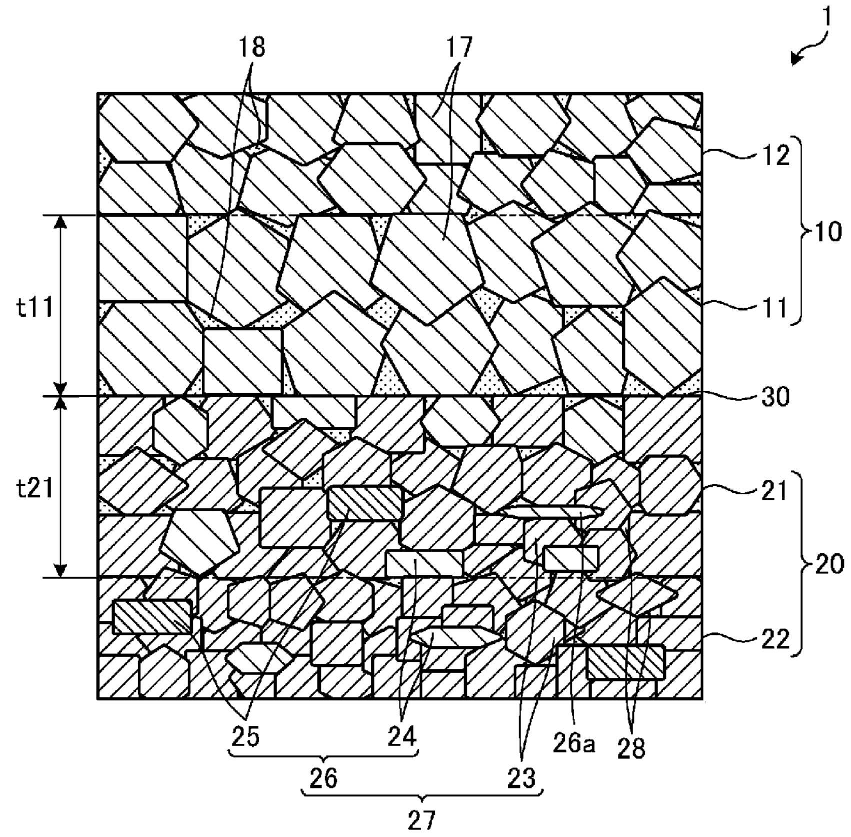
FIG. 2 is an enlarged view of a region A illustrated in FIG. 1.

FIG. 2 is an enlarged view of a region A illustrated in FIG. 1. In the heater 1, as illustrated in FIG. 2, the ceramic base 10 and the heat generating resistor 20 are positioned facing each other across an interface 30.

The ceramic base 10 includes a plurality of crystal particles 17 and a grain boundary phase 18.

The crystal particles 17 are made of silicon nitride. The crystal particles 17 may contain $Si_3N_4$ having β-phase crystals.

When the crystal particles 17 are made of silicon nitride, the ceramic base 10 has high strength and excellent heat resistance as compared with a case where the crystal particles 17 are made of another ceramic material such as alumina or zirconia, and thus the heater 1 can be used at a higher temperature.

The ceramic base 10 may contain impurities such as SiAlON, SiC, $Si_2N_2O$, and an Mg silicon nitride compound, in addition to the crystal particles 17 made of silicon nitride. The ceramic base 10 may contain crystal particles 17 containing elements other than Si and N, such as O and C, for example.

The crystal particles 17 may have an aspect ratio of 1 or more and 2 or less. The aspect ratio is obtained by dividing the major axis of the crystal particles 17 of the ceramic base 10 by the minor axis thereof. The major axis refers to the length of the longest portion of the target crystal particle 17, and the minor axis refers to the length of the longest portion in a direction perpendicular to the major axis. By setting the aspect ratio of the crystal particles 17 to 1 or more and 2 or less, the durability of the heater 1 can be further enhanced, for example.

One of the reasons that the durability of the heater 1 can be further enhanced is considered to be as follows, for example. That is, when the aspect ratio of the crystal particles 17 is set to 1 or more and 2 or less, heat conduction and stress due to heat in the ceramic base 10 tend to be transmitted uniformly in all directions. Therefore, a part of the grain boundary phase 18 located between the plurality of crystal particles 17 present in the region 11 including the interface 30 with the heat generating resistor 20 is softened during energization, and stress generated in the ceramic base 10 including the interface 30 tends to be relaxed in all directions. Thus, the durability of the heater 1 can be further enhanced. That is, the number of the crystal particles 17 having an aspect ratio of 1 or more and 2 or less may be greater in the region 21 than in the region 22.

The grain boundary phase 18 is located between the plurality of crystal particles 17. The grain boundary phase 18 is a first grain boundary phase containing oxides of a rare earth element and silicon. The grain boundary phase 18 refers to a portion in which a rare earth element can be found by Electron Probe Micro Analyzer (EPMA) analysis, of the grain boundary partitioning adjacent crystal particles 17. The EPMA analysis can be performed by sampling the ceramic base portion of the heater 1, detecting the crystal particles 17 with a scanning electron microscope (SEM), and performing analysis while focusing on gaps between the crystal particles 17. The rare earth element can be specified by using wavelength dispersion spectroscopy.

As described above, the grain boundary phase 18 contains oxides of a rare earth element and silicon. When the grain boundary phase 18 contains oxides of a rare earth element and silicon, excessive softening of the ceramic base 10 accompanying heat generation of the heater 1 can be suppressed, and shape retention can be ensured, for example. The grain boundary phase 18 may contain Yb, Y, or Er, for example, as a rare earth element.

The ceramic base 10 includes regions 11 and 12. The region 11 is an example of a first region, and the region 12 is an example of a second region. The region 11 is a portion that includes the interface 30 and faces the heat generating resistor 20. The region 11 is a region in which the thickness t11 from the interface 30 is up to 0.5 mm, for example. The region 12 is a portion farther away from the heat generating resistor 20 than the region 11. The region 12 is a region in which the thickness t11 from the interface 30 is beyond 0.5 mm, for example.

In the heater 1, thermal stress generated by repetition of temperature increase and temperature decrease over a long period of time is concentrated on the interface 30 between the ceramic base 10 and the heat generating resistor 20, and microcracks may occur at the interface 30 or in the vicinity thereof. If the heater 1 in which microcracks have occurred is continuously used, the heat generating resistor 20 may possibly be broken.

In the heater 1 according to the embodiment, the distribution amount of the grain boundary phase 18 is different between the regions 11 and 12. Specifically, the distribution amount of the grain boundary phase 18 is greater in the region 11 than in the region 12. In the present disclosure, the "distribution amount of the grain boundary phase 18" refers to the distribution area of the grain boundary phase 18 per unit area in each of the regions 11 and 12 of the ceramic base 10 in a cross-sectional view. By making the distribution amount of the grain boundary phase 18 located in the region 11 greater than the distribution amount of the grain boundary phase 18 located in the region 12, the durability of the heater 1 can be enhanced, for example.

One of the reasons that the durability of the heater 1 can be enhanced is considered to be as follows, for example. That is, in the heater 1 in which the distribution amount of the grain boundary phase 18 located in the region 11 including the interface 30 is greater than that in the region 12, a part of the grain boundary phase 18 located in the region 11 including the interface 30 with the heat generating resistor 20 is softened during energization, and stress generated in the ceramic base 10 including the interface 30 is relaxed. For example, when microcracks occur in the vicinity of the boundary between the ceramic base 10 and the heat generating resistor 20 including the interface 30, a part of the grain boundary phase 18 heated along with energization of the heat generating resistor 20 diffuses into the microcracks and fills the microcracks. As described above, according to the heater 1 of the embodiment, microcracks generated at the interface 30 can be self-repaired. As a result, the durability of the heater 1 can be enhanced.

Since the distribution amount of the grain boundary phase 18 is less in the region 12 away from the interface 30 than in the region 11, the crystal particles 17 are more densely distributed in the region 12 than in the region 11. Since the crystal particles 17 have greater thermal conductivity than the grain boundary phase 18, the region 12 has greater thermal conductivity than the region 11.

In the ceramic base 10, the average dimension of the grain boundary phase 18 may be different between the regions 11 and 12. Specifically, the average dimension of the grain boundary phase 18 may be larger in the region 11 than in the region 12. In the present disclosure, the "average dimension of the grain boundary phase 18" refers to an average value of dimensions of the grain boundary phases 18 located per unit area in each of the regions 11 and 12 of the ceramic base 10 in a cross-sectional view. The "dimension of the grain boundary phase 18" refers to an equivalent circle diameter of each grain boundary phase 18 in each of the regions 11 and 12 of the ceramic base 10 in a cross-sectional view. By making the average dimension of the grain boundary phase 18 located in the region 11 larger than the average dimension of the grain boundary phase 18 located in the region 12, the durability of the heater 1 can be enhanced, for example.

One of the reasons that the durability of the heater 1 can be enhanced is considered to be as follows, for example. That is, in the heater 1 in which the average dimension of the grain boundary phase 18 located in the region 11 including the interface 30 is larger than that of the region 12, the absolute amount of the component to be softened during energization, in the grain boundary phase 18 located in the region 11 including the interface 30 with the heat generating resistor 20, is increased. Therefore, the softened component of the grain boundary phase 18 tends to reach microcracks generated in the vicinity of the interface 30 which is the boundary between the ceramic base 10 and the heat generating resistor 20, for example, and fill the microcracks. Therefore, the microcracks generated at the interface 30 can be more accurately self-repaired. As a result, the durability of the heater 1 can be further enhanced.

In the ceramic base 10, the average dimension of the crystal particles 17 may be different between the regions 11 and 12. Specifically, the average dimension of the crystal particles 17 may be larger in the region 11 than in the region 12. In the present disclosure, the "average dimension of the crystal particles 17" refers to an average value of equivalent circle diameters of the crystal particles 17 located per unit area in each of the regions 11 and 12 of the ceramic base 10 in a cross-sectional view. By making the average dimension of the crystal particles 17 located in the region 11 larger than the average dimension of the crystal particles 17 located in the region 12, the durability of the heater 1 can be enhanced, for example.

One of the reasons that the durability of the heater 1 can be enhanced is considered to be as follows, for example. That is, when the average dimension of the crystal particles 17 increases, the crack extension distance per crystal particle 17 is likely to increase. This can reduce a failure in which cracks generated in the crystal particles 17 located in the region 11 of the ceramic base 10 reach the heat generating resistor 20 beyond the interface 30 and further break the heat generating resistor 20. As a result, the durability of the heater 1 can be enhanced.

The heat generating resistor 20 includes a plurality of crystal particles 27 and a grain boundary phase 28. The crystal particles 27 include conductor particles 23 and insulator particles 26.

The conductor particles 23 are composed of a conductor element. Being “composed of a conductor element” means that 99 mass % or more of the conductor element is contained in 100 mass % of all the elements constituting the conductor particles 23. The conductor particles 23 may contain tungsten or molybdenum as the conductor element. The conductor element contained in the conductor particles 23 may be tungsten carbide (WC). The conductive particles 23 may contain 1 mass % or less of impurities in addition to the conductor element.

The insulator particles 26 are composed of silicon nitride. Being “composed of silicon nitride” means that 99 mass % or more of silicon nitride is contained in 100 mass % of all the elements constituting the insulator particles 26.

The insulator particles 26 may include needle-like crystals 26*a*. In the present disclosure, the term “needle-like crystals 26*a*” refers to a crystalline structure grown in one direction in a long shape like a needle in a cross-sectional view of the insulator particles 26. The aspect ratio of the needle-like crystals 26*a* may be 3 or more and 20 or less, for example.

The insulator particles 26 may have a greater proportion of needle-like crystals than the crystal particles 17 of the ceramic base 10. When the proportion of the needle-like crystals 26*a* contained in the insulator particles 26 is made greater than the proportion of the needle-like crystals contained in the crystal particles 17, the durability of the heater 1 can be enhanced, for example.

One of the reasons that the durability of the heater 1 can be enhanced is considered to be as follows, for example. That is, in the heat generating resistor 20, when the needle-like crystals 26*a* are located so as to be caught between the plurality of crystal particles 27, the toughness of the region where the needle-like crystals 26*a* are located is improved. Therefore, since the heat generating resistor 20 having a lower proportion of the needle-like crystals 26*a* to the insulator particles 26 has greater toughness than the ceramic base 10, microcracks are less likely to occur in the heat generating resistor 20 even when a part of the grain boundary phase 28 located in the region 21 including the interface 30 with the ceramic base 10 is softened during energization, for example. Thus, the durability of the heater 1 can be enhanced. The crystal particles 17 of the ceramic base 10 may not include needle-like crystals.

The insulator particles 26 may include first crystalline bodies 24 and second crystalline bodies 25. The first crystalline bodies 24 may be $Si_3N_4$ having α-phase crystals. The second crystalline bodies 25 may be $Si_3N_4$ having β-phase crystals. The heat generating resistor 20 may contain more first crystalline bodies 24 than second crystalline bodies 25.

The grain boundary phase 28 is located between the plurality of crystal particles 27. The grain boundary phase 28 is an example of a second grain boundary phase containing oxides of a rare earth element and silicon. The grain boundary phase 28 refers to a portion in which segregation of an element different from that of the crystal particles 27 can be found by EPMA analysis, of the grain boundary partitioning the conductor particles 23 and/or the insulator particles 26 constituting adjacent crystal particles 27. The EPMA analysis can be performed by sampling a portion of the heat generating resistor 20 of the heater 1, detecting the crystal particles 27 with a scanning electron microscope (SEM), and performing analysis while focusing on gaps between the crystal particles 27. The element can be specified by using wavelength dispersion spectroscopy. The grain boundary phase 28 may be located between the conductor particles 23 and the insulator particles 26 which are adjacent to each other, may be located between the plurality of conductor particles 23, or may be located between the plurality of insulator particles 26.

The grain boundary phase 28 may contain oxides of a rare earth element and silicon, for example. When the grain boundary phase 28 contains oxides of a rare earth element and silicon, excessive softening of the heat generating resistor 20 accompanying heat generation of the heater 1 can be suppressed, and shape retention can be ensured, for example. The grain boundary phase 28 may contain Yb, Y, or Er, for example, as a rare earth element.

The heater 1 in which the grain boundary phases 18 and 28 contain a specific rare earth element can be obtained by immersing a primary sintered body or a conductor paste as the material of the heat generating resistor 20 in a solution or a suspension containing an oxide of a rare earth element ($Yb_2O_3$, for example), and then secondarily sintering the primary sintered body or the conductor paste together with a primary sintered body as the material of the ceramic base 10, for example. The method of manufacturing the heater 1 is merely an example, and the heater 1 may be manufactured by any method.

The heat generating resistor 20 may include regions 21 and 22. The region 21 is an example of a third region, and the region 22 is an example of a fourth region. The region 21 is a portion that includes the interface 30 and faces the ceramic base 10. The region 21 is a region in which the thickness t21 from the interface 30 is up to 0.2 mm, for example. The region 22 is a portion farther away from the ceramic base 10 than the region 21. The region 22 is a region in which the thickness t21 from the interface 30 is beyond 0.2 mm, for example.

In the heat generating resistor 20, the distribution amount of the grain boundary phase 28 may be different between the regions 21 and 22. Specifically, the distribution amount of the grain boundary phase 28 may be greater in the region 21 than in the region 22. In the present disclosure, the “distribution amount of the grain boundary phase 28” refers to the distribution area of the grain boundary phase 28 per unit area in each of the regions 21 and 22 of the heat generating resistor 20 in a cross-sectional view. By making the distribution amount of the grain boundary phase 28 located in the region 21 greater than the distribution amount of the grain boundary phase 28 located in the region 22, the durability of the heater 1 can be enhanced, for example.

One of the reasons that the durability of the heater 1 can be enhanced is considered to be as follows, for example. That is, in the heater 1 in which the distribution amount of the grain boundary phase 28 located in the region 21 including the interface 30 is greater than that in the region 22, a part of the grain boundary phase 28 located in the region 21 including the interface 30 with the ceramic base 10 is softened during energization, and stress generated in the heat generating resistor 20 including the interface 30 is relaxed. For example, when microcracks occur in the vicinity of the boundary between the heat generating resistor 20 and the ceramic base 10 including the interface 30, a part of the grain boundary phase 28 heated along with energization of the heat generating resistor 20 diffuses into the microcracks and fills the microcracks. As described above, according to the heater 1 of the embodiment, microcracks generated at the interface 30 can be self-repaired. As a result, the durability of the heater 1 can be enhanced.

In the heat generating resistor 20, the average dimension of the grain boundary phase 28 may be different between the regions 21 and 22. Specifically, the average dimension of the grain boundary phase 28 may be larger in the region 21 than in the region 22. In the present disclosure, the "average dimension of the grain boundary phase 28" refers to an average value of dimensions of the grain boundary phases 28 located per unit area in each of the regions 21 and 22 of the heat generating resistor 20 in a cross-sectional view. The "dimension of the grain boundary phase 28" refers to an equivalent circle diameter of each grain boundary phase 28 in each of the regions 21 and 22 of the heat generating resistor 20 in a cross-sectional view. By making the average dimension of the grain boundary phase 28 located in the region 21 larger than the average dimension of the grain boundary phase 28 located in the region 22, the durability of the heater 1 can be enhanced, for example.

One of the reasons that the durability of the heater 1 can be enhanced is considered to be as follows, for example. That is, in the heater 1 in which the average dimension of the grain boundary phase 28 located in the region 21 including the interface 30 is larger than that of the region 22, the absolute amount of the component to be softened during energization, in the grain boundary phase 28 located in the region 21 including the interface 30 with the ceramic base 10, is increased. Therefore, the softened component of the grain boundary phase 28 tends to reach microcracks generated in the vicinity of the boundary between the heat generating resistor 20 and the ceramic base 10 including the interface 30, for example, and fill the microcracks. Therefore, the microcracks generated at the interface 30 can be more accurately self-repaired. As a result, the durability of the heater 1 can be further enhanced.

In the heat generating resistor 20, the content of the insulator particles 26 may be different between the regions 21 and 22. Specifically, the content of the insulator particles 26 may be greater in the region 21 than in the region 22. In the present disclosure, the "content of the insulator particles 26" refers to the total area of the insulator particles 26 per unit area in each of the regions 21 and 22 of the heat generating resistor 20 in a cross-sectional view. By making the content of the insulator particles 26 located in the region 21 greater than the content of the insulator particles 26 located in the region 22, the durability of the heater 1 can be enhanced, for example.

One of the reasons that the durability of the heater 1 can be enhanced is considered to be as follows, for example. That is, the insulator particles 26 located in the region 21 are similar in composition to the crystal particles 17 located in the region 11 adjacent to the region 21 across the interface 30. Therefore, when the content of the insulator particles 26 located in the region 21 is greater than that of the region 22, the adhesiveness between the heat generating resistor 20 and the ceramic base 10 is enhanced, and thus the durability of the heater 1 can be enhanced.

Since the content of the insulator particles 26 is lower in the region 22 away from the interface 30 than in the region 21, the content of the conductor particles 23 is relatively greater in the region 22 than in the region 21. Since the region 22 of the heat generating resistor 20 has a greater amount of charge transfer per unit volume than the region 21, the durability of the heater 1 can be enhanced even when the heater 1 is used at a high output, for example.

In the heat generating resistor 20, the average dimension of the insulator particles 26 may be different between the regions 21 and 22. Specifically, the average dimension of the insulator particles 26 may be larger in the region 21 than in the region 22. In the present disclosure, the "average dimension of the insulator particles 26" refers to an average value of equivalent circle diameters of the insulator particles 26 located per unit area in each of the regions 21 and 22 of the heat generating resistor 20 in a cross-sectional view. By making the average dimension of the insulator particles 26 located in the region 21 larger than the average dimension of the insulator particles 26 located in the region 22, the durability of the heater 1 can be enhanced, for example.

One of the reasons that the durability of the heater 1 can be enhanced is considered to be as follows, for example. That is, the insulator particles 26 having a large average dimension tend to be more resistant to impact than the insulator particles 26 having a small average dimension. By making the average dimension of the insulator particles 26 located in the region 21 including the interface 30 greater than the average dimension of the insulator particles 26 located in the region 22, the strength of the region 21 including the interface 30 on which stress is likely to be concentrated can be maintained. Therefore, the durability of the heater 1 can be enhanced.

Since the direction of thermal expansion occurring when the heat generating resistor 20 is rapidly energized is different for each of the conductor particles 23, for example, the insulator particles 26 close to the conductor particles 23 are more likely to release stress as the average dimension is smaller. Since the amount of charge transfer per unit time is greater in the region 22 away from the interface 30 than in the region 21, the stress generated in the heat generating resistor 20 can be relaxed by making the average dimension of the insulator particles 26 located in the region 22 smaller than the average dimension of the insulator particles 26 located in the region 21. Therefore, the durability of the heater 1 can be enhanced.

In the heater 1, the average dimension of the crystal particles made of silicon nitride may be different between the regions 11 and 21 adjacent to each other across the interface 30. Specifically, the crystal particles 17 located in the region 21 may have a larger average dimension than the insulator particles 26 located in region 22. By making the average dimension of the crystal particles 17 located in the region 11 larger than the average dimension of the insulator particles 26 located in the region 21, the durability of the heater 1 can be enhanced, for example.

One of the reasons that the durability of the heater 1 can be enhanced is considered to be as follows, for example. That is, in the region 11 including the crystal particles 17 having a large average dimension, the thermal conductivity is improved as compared with the region 22 including the insulator particles 26 having a small average dimension. Therefore, the thermal stress generated in the region 11 near the heat generating resistor 20 can be relaxed, and thus the durability of the heater 1 can be enhanced.

The locations of the crystal particles 17 and the grain boundary phase 18 included in the ceramic base 10 and the crystal particles 27 (the conductor particles 23 and the insulator particles 26) and the grain boundary phase 28 included in the heat generating resistor 20 can be found by cross-sectional observation of the heater 1 by EPMA analysis. The dimensions and the average dimensions of the crystal particles 17 and the grain boundary phase 18 can be calculated based on the results of observation of the cross section of the ceramic base 10 by SEM. The crystalline structures of the crystal particles 17 and the insulator particles 26 can be measured using an X-ray diffractometer (XRD).

As described above, a heater 1 according to the embodiment includes a ceramic base 10 and a heat generating resistor 20. The ceramic base 10 includes a plurality of crystal particles 17 made of silicon nitride and a first grain boundary phase (grain boundary phase 18) located between the plurality of crystal particles 17 and containing oxides of a rare earth element and silicon. The heat generating resistor 20 is located inside the ceramic base 10. The ceramic base 10 includes a first region (region 11) including an interface 30 with the heat generating resistor 20 and a second region (region 12) farther away from the heat generating resistor 20 than the first region. A distribution amount of the first grain boundary phase is greater in the first region than in the second region. As a result, the heater 1 having high durability can be provided.

In the embodiment, an average dimension of the first grain boundary phase is larger in the first region than in the second region. As a result, the heater 1 having high durability can be provided.

In the embodiment, the heat generating resistor 20 includes a plurality of crystal particles 27 made of a conductor element or silicon nitride, a second grain boundary phase (grain boundary phase 28) located between the plurality of crystal particles and containing oxides of a rare earth element and silicon. The heat generating resistor 20 also includes a third region (region 21) including an interface 30 with the ceramic base 10 and a fourth region (region 22) farther away from the ceramic base 10 than the third region. A distribution amount of the second grain boundary phase is greater in the third region than in the fourth region. As a result, the heater 1 having high durability can be provided.

In the embodiment, an average dimension of the second grain boundary phase is larger in the third region than in the fourth region. As a result, the heater 1 having high durability can be provided.

In the embodiment, the third region has a greater content of the plurality of crystal particles made of silicon nitride than the fourth region. As a result, the heater 1 having high durability can be provided.

In the embodiment, a proportion of needle-like crystals **26*a* in the crystal particles made of silicon nitride contained in the heat generating resistor 20 is greater than a proportion of needle-like crystals in the crystal particles 17 made of silicon nitride contained in the ceramic base 10. As a result, the heater 1** having high durability can be provided.

In the embodiment, an aspect ratio of the crystal particles 17 made of the silicon nitride contained in the ceramic base 10 is 1 or more and 2 or less. As a result, the heater 1 having high durability can be provided.

Additional effects and other aspects can be easily derived by a person skilled in the art. Thus, a wide variety of aspects of the present disclosure are not limited to the specific details and representative embodiments represented and described above. Accordingly, various changes are possible without departing from the spirit or scope of the general inventive concepts defined by the appended claims and their equivalents.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A heater comprising:
a ceramic base comprising
a plurality of crystal particles made of silicon nitride, and
a first grain boundary phase located between the plurality of crystal particles and containing oxides of a rare earth element and silicon; and
a heat generating resistor located inside the ceramic base, wherein
the ceramic base comprises
a first region comprising an interface with the heat generating resistor, and
a second region farther away from the heat generating resistor than the first region, and
a distribution amount of the first grain boundary phase in the first region is greater than a distribution amount of the first grain boundary phase in the second region.

2. The heater according to claim 1, wherein
an average dimension of the first grain boundary phase in the first region is larger than an average dimension of the first grain boundary phase in the second region.

3. The heater according to claim 1, wherein:
the heat generating resistor comprises
a plurality of crystal particles made of a conductor element or silicon nitride,
a second grain boundary phase located between the plurality of crystal particles made of the conductor element or silicon nitride and containing oxides of a rare earth element and silicon;
a third region comprising an interface with the ceramic base, and
a fourth region farther away from the ceramic base than the third region; wherein
a distribution amount of the second grain boundary phase in the third region is greater than a distribution amount of the second grain boundary phase in the fourth region.

4. The heater according to claim 3, wherein
an average dimension of the second grain boundary phase in the third region is larger than an average dimension of the second grain boundary phase in the fourth region.

5. The heater according to claim 3, wherein
the third region has a greater content of the plurality of crystal particles made of silicon nitride than the fourth region.

6. The heater according to claim 1, wherein
the heat generating resistor comprises
a plurality of crystal particles made of silicon nitride,
a proportion of needle-like crystals in the plurality of crystal particles made of silicon nitride contained in the heat generating resistor is greater than a proportion of needle-like crystals in the crystal particles made of silicon nitride contained in the ceramic base.

7. The heater according to claim 1, wherein
an aspect ratio of the plurality of crystal particles made of the silicon nitride contained in the ceramic base is 1 or more and 2 or less.

* * * * *